Sept. 23, 1958     W. E. PEERY     2,853,123
CLIP FOR SPRINGS
Filed April 10, 1957
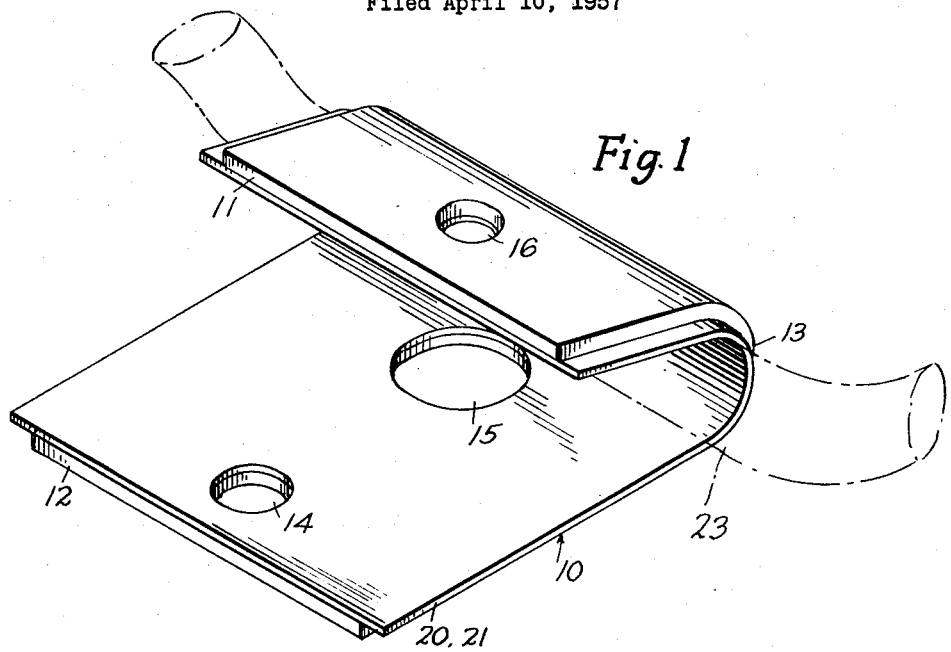
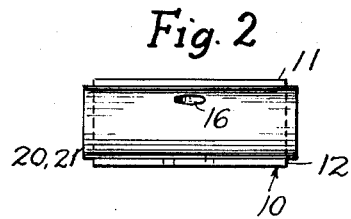
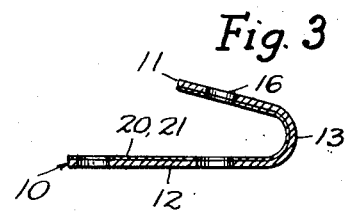
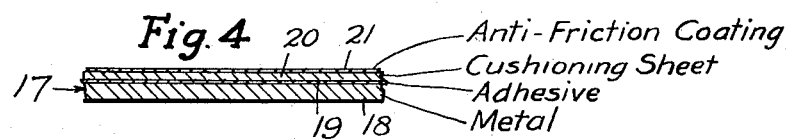
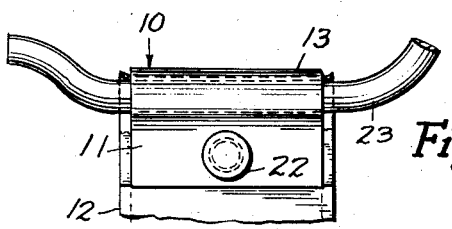
INVENTOR.
Walter E. Peery
BY
ATTORNEY United States Patent Office 2,853,123
Patented Sept. 23, 1958

2,853,123
CLIP FOR SPRINGS

Walter E. Peery, Far Hills, N. J., assignor to Kay Manufacturing Corporation, Brooklyn, N. Y., a corporation of New York Application April 10, 1957, Serial No. 651,936

5 Claims. (Cl. 155—179)

This invention relates to clips used for springs in the seats and backs of furniture and the like, and particularly to metallic clips for holding in place the ends of wire springs.

For example, the sinuous springs used in furniture and automobile seats have substantially parallel cross bars joined alternately by end loops and are secured in place by means of metallic clips each having a bend embracing the substantially straight portion of the end bar of the spring, the clips being nailed or otherwise fastened to a frame or other support. Since the spring is mounted so that its end bar constantly exerts considerable pressure on the bend of the clip, the assembled spring and clip may produce objectionable noises resulting from the parts rubbing against each other when additional load is alternately put thereon and removed.

To prevent such noises, the inner surface of the clip has heretofore been lined with paper or cloth. However, the sound-deadening function of the lining is short lived. When made of cloth, it deteriorates rapidly under the abrasive action of particles of steel, lining and paint worn or ground off the parts under the pressure thereon and relative though slight movement thereof. When made of paper, squeaking frequently occurs immediately on assembly or soon thereafter.

At the comparatively sharp edges of the bend of the clip where the end bar of the spring emerges from the embrace of the clip, the wear is usually greatest. Shaping said sharp side edges to space them away from the cross bar has not proven to be completely satisfactory in eliminating squeaks, clicks and other noises.

I have found, however, that a relatively thin coating or film of a suitable solid plastic material having a low coefficient of friction, as a protecting and lubricating surface of a clip lining, which lining is sufficiently thick to act as a cushion, is eminently satisfactory in prolonging the sound-deadening life of the lining in use far beyond what might normally have been expected. I attribute this result to the fact that the protecting layer or film of anti-friction material acts in a manner akin to that of a solid lubricant. Being soft and flexible, the protecting layer, though quite thin, merely transmits the pressure thereon to the cushioning layer without being squeezed out from in between the spring and its clip and thereby prevents direct contact between the spring end and the cushioning layer or clip metal. It permits the spring bar to move easily relatively thereto and to the lining, even under high pressure, without noise or injury to itself or to the lining of which it forms a part. Consequently, no specks or particles of metal, lining or paint tend to grind or wear off or to abrade and ultimately wear out the lining.

By extending the cushioning lining beyond the side edges of the clip, danger of direct contact between the metallic spring and clip is additionally minimized.

In the drawings,

Fig. 1 is a perspective view of a spring clip to which the invention has been applied, showing in dash-dot lines the end bar of a wire spring held by the clip.

Fig. 2 is an end elevational view of the clip.

Fig. 3 is a side elevational view thereof.

Fig. 4 is a sectional view of the laminated clip material.

Fig. 5 is a top plan view with parts broken away, of the assembled clip and spring end, as they appear in operation.

As illustrated, the clip 10 is of the usual type, having an upper flange 11 and a lower flange 12 joined by the bend 13. Suitable perforations 14, 15 and 16 receive the securing elements such as the nails 22 (Fig. 5) which fasten the clip in place and hold the upper flange around the spring end bar 23. The laminated clip material 17 comprises the relatively thick metallic layer 18 on which is spread the layer 19 of adhesive, the layer 20 of cushioning material secured to the metallic layer by the adhesive, and finally the operative protecting layer, coating or film 21 of anti-friction material, the layers 20, 21 constituting the lining. The protecting film 21 is preferably quite thin, being on the order of about 0.001 inch in thickness when made of polyethylene and used on a layer of cushioning material of greater thickness.

I have found that if no cushioning layer is used, a relatively thick protecting layer on the metal layer is likely to be thinned by the localized pressure thereon at the high spots of the end bar 23 or the metal layer 18, to an extent that its protecting function is lost. An unduly thick polyethylene coating without an interposed cushion at the pressure point tends to flow or extrude out from between the spring and the clip proper, and to permit the spring and layer 18 to come into direct contact with resulting noises. The cushioning layer prevents such flow or extrusion.

The coating or film 21 consists of a suitable soft plastic and homogeneous waxy material having a low coefficient of friction and adapted to form a homogeneous layer substantially non-resistant to the movement of the spring relatively thereto and not likely to become displaced or to wear off. As has been indicated, said film 21 is of polyethylene. It is self-retained against displacement and operative to prevent the objectionable wear or concentrated pressure on the rest of the lining or cushioning material which soon results in the undesirable noises which it is the purpose of the lining to eliminate.

It has been observed that in connection with the use of a polyethylene film, some of the polyethylene is ultimately pulverized to some limited extent by the wearing action of the spring oscillation. The polyethylene particles, however, are retained in the surface of the cushioning material and continue their lubricating action so that the film may be said to be in effect self-perpetuating.

It has already been pointed out that the layer 20 of cushioning material is interposed between the metal of the clip proper and the polyethylene, to bear the pressure of the spring. The principal effect of the cushioning material is to distribute the pressure of the spring bar 23 evenly over the mating surfaces of the spring bar and the underlying material and thereby avoid small areas of extremely high pressure which would cause local extrusion of the lubricating layer and consequent rubbing contact between the spring bar and the underlying material with resulting noises. Said layer 20 is also intended to yield sufficiently under pressure to absorb the compressive force exerted by the spring on the lining 20, 21 thereby to prevent formation of ground off particles which might act as abrasives on the lining and the metal. The cushioning material is of the proper type to take the major part of the stress put on the film and thereby prevents the film from being stressed excessively. Said material may be paper or fiber, cloth or the like and is about from ten to thirty times the thickness of the film 21 and is more or less compressible.

The thickness of the cushioning layer is intermediate that of the film and that of the metallic layer. If a sheet of paper fiber is used, such as is known as vulcanized fiber, the thickness of the cushioning layer may range from about 0.01 inch to 0.03 inch.

While certain specific forms of the invention have herein been shown and described, various obvious changes may be made therein without departing from the spirit of the invention defined by the appended claims.

I claim:

1. In a clip for holding the oscillatory end of a wire spring, a fibrous lining of sufficient strength to withstand the stresses incident to the oscillation of the loaded spring end in the clip, and means rendering the lining silent under said oscillation comprising a relatively thin layer of polyethylene bonded to the lining.

2. The clip of claim 1, the fibrous lining being paper.

3. The clip of claim 1, the thickness of the polyethylene layer being on the order of 0.001 of an inch.

4. The clip of claim 3, the fibrous lining being of paper thicker than the polyethylene layer.

5. The combination with a wire spring having an end portion, of a metallic clip pivotally supporting said portion, a paper lining secured to the clip, and a noise-eliminating relatively thin layer of polyethylene thinner than the paper lining interposed between the end portion and the lining and firmly bonded to the lining.

References Cited in the file of this patent

UNITED STATES PATENTS

| | | |
|---|---|---|
| 1,263,205 | Catucci | Apr. 16, 1918 |
| 2,652,885 | Engel | Sept. 22, 1953 |